US008477759B2

(12) United States Patent
Dyck et al.

(10) Patent No.: US 8,477,759 B2
(45) Date of Patent: Jul. 2, 2013

(54) FILTERING OF MALFORMED DATA PACKETS IN WIRELESS COMMUNICATION

(75) Inventors: Jeffrey Alan Dyck, San Diego, CA (US); Marcello Lioy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1742 days.

(21) Appl. No.: 11/240,025

(22) Filed: Sep. 30, 2005

(65) Prior Publication Data

US 2007/0076690 A1    Apr. 5, 2007

(51) Int. Cl.
H04L 12/66    (2006.01)

(52) U.S. Cl.
USPC .......................................... 370/352; 370/310

(58) Field of Classification Search
USPC ........... 370/352, 310, 338, 335, 342; 455/403
See application file for complete search history.

(56) References Cited

U.S. PATENT DOCUMENTS

| 5,884,025 | A  | * | 3/1999  | Baehr et al. .................. 726/13 |
| 6,147,976 | A  | * | 11/2000 | Shand et al. ................. 370/254 |
| 6,931,569 | B2 | * | 8/2005  | Fong et al. ................... 714/18 |
| 7,716,729 | B2 | * | 5/2010  | Bhatia ......................... 726/13 |
| 7,818,794 | B2 | * | 10/2010 | Wittman ....................... 726/13 |
| 2002/0066275 | A1 | * | 6/2002  | Jungsch et al. ............... 60/772 |
| 2002/0122394 | A1 |   | 9/2002  | Whitmore et al. |
| 2003/0227880 | A1 |   | 12/2003 | Heller et al. |
| 2004/0193917 | A1 | * | 9/2004  | Drews ......................... 713/201 |
| 2004/0243835 | A1 | * | 12/2004 | Terzis et al. .................. 713/200 |
| 2005/0007986 | A1 | * | 1/2005  | Malladi et al. ................ 370/342 |
| 2005/0191997 | A1 | * | 9/2005  | Spearman et al. ............. 455/418 |
| 2006/0276173 | A1 | * | 12/2006 | Srey et al. ..................... 455/410 |
| 2007/0071018 | A1 | * | 3/2007  | Laboy et al. .................. 370/401 |
| 2007/0081524 | A1 | * | 4/2007  | Franz et al. ................... 370/356 |
| 2007/0223410 | A1 | * | 9/2007  | Oyama et al. ................. 370/310 |
| 2011/0023106 | A1 | * | 1/2011  | Murotake et al. .............. 726/11 |

FOREIGN PATENT DOCUMENTS

| JP | 2003209561 |    | 7/2003 |
| JP | 2005519504 |    | 6/2005 |
| WO | 2005094037 | A1 | 10/2005 |

OTHER PUBLICATIONS

International Search Report and Written Opinion—PCT/US2006/038102, International Search Authority—European Patent Office—Jan. 17, 2007.

* cited by examiner

*Primary Examiner* — William Deane, Jr.
(74) *Attorney, Agent, or Firm* — Kevin Cheatham

(57) ABSTRACT

Packet filtering is performed to detect for and discard malformed data packets that would be discarded by a wireless network if received from a wireless device. A cdma2000 network may restart a PPP session upon receiving (1) malformed data packets with source IPv4 addresses different from IPv4 addresses (if any) assigned to the wireless device or (2) malformed data packets with source IPv6 addresses having prefixes different from prefixes (if any) associated with the PPP session. The wireless device may receive data packets from a terminal equipment coupled to the wireless device and/or applications running at the wireless device. The wireless device may filter these data packets with packet filters to detect for malformed data packets with invalid IPv4 addresses, invalid IPv6 address prefixes, and so on. The wireless device discards malformed data packets and sends the remaining data packets to the wireless network.

24 Claims, 8 Drawing Sheets

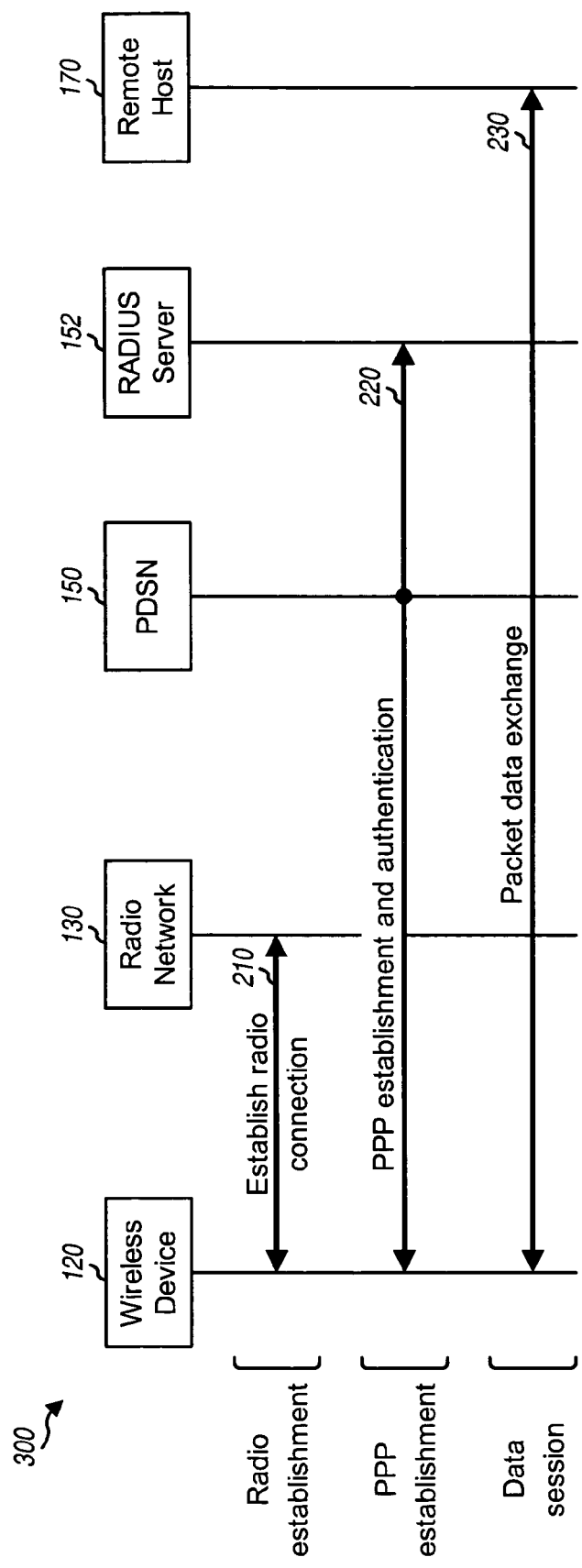

Packet Filters

| Protocol Type | Header Field | Value | Action |
|---|---|---|---|
| IPv4 | Source IP Address | y | Pass if match |
| IPv6 | Prefix of Source IP Address | z | Pass if match |
| IPX | Source Address | u | Pass if match |
| TCP | Source Port | v | Pass if match |
| Ethernet | Source MAC Address | w | Pass if match |
| Any | Any | Any | Discard |

FILTERING OF MALFORMED DATA PACKETS IN WIRELESS COMMUNICATION

BACKGROUND

I. Field

The present disclosure relates generally to communication, and more specifically to techniques for filtering data packets in a wireless communication network.

II. Background

Wireless communication networks are widely deployed to provide various communication services such as voice, packet data, broadcast, messaging, and so on. These wireless networks may support data services using various wireless data technologies.

A wireless device may be coupled to a terminal equipment and used to provide or support data services for the terminal equipment. The wireless device may be a cellular phone, a data card, a personal digital assistant (PDA), or some other device that is capable of accessing a wireless network. The terminal equipment may be a laptop computer, a PDA, or some other computing device. The terminal equipment may use the wireless device to gain access to the wireless network for data connectivity, e.g., general Internet access. For outbound data, the wireless device receives data packets from the terminal equipment and forwards these data packets toward a gateway, which is a network entity designated to handle packet data. For inbound data, the wireless device receives data packets from the gateway and forwards these data packets to the terminal equipment. The wireless device typically acts as a transparent conduit via which the terminal equipment and the gateway can exchange packet data.

The terminal equipment may generate malformed data packets, which are data packets that are defective for various reasons, as described below. These malformed data packets waste valuable radio resources to transmit and may cause deleterious effects on the network side. There is therefore a need in the art for techniques to deal with these malformed data packets.

SUMMARY

Techniques for performing packet filtering to detect for and discard malformed data packets are described herein. Malformed data packets are data packets that would be discarded by a wireless network if received from a wireless device. For example, the malformed data packets may include data packets that are improperly formed, data packets that are properly formed but do not serve any useful purposes, and data packets that should not be sent over the air for whatever reasons. For cdma2000, a Point-to-Point Protocol (PPP) session is established between the wireless network and the wireless device. The wireless network may restart the PPP session (or trigger PPP renegotiation) upon receiving (1) malformed data packets with source Internet Protocol Version 4 (IPv4) addresses that are different from IPv4 addresses (if any) assigned to the wireless device or (2) malformed data packets with source IP Version 6 (IPv6) addresses having prefixes that are different from prefixes (if any) associated with the PPP session. Hence, the wireless device may detect for and discard malformed data packets with invalid IPv4 addresses and malformed data packets with invalid IPv6 address prefixes.

In an embodiment, a data session is initially established for the wireless device with the wireless network. IPv4 addresses that have been assigned to the wireless device and/or IPv6 address prefixes that are associated with the data session, if any, are determined. Packet filters used to filter out malformed data packets are formed based on any assigned IPv4 addresses and/or any associated IPv6 address prefixes. Thereafter, data packets are received from a terminal equipment coupled to the wireless device and/or applications running at the wireless device. The data packets are filtered with the packet filters to detect for malformed data packets that would be discarded by the wireless network if sent. The data packets may be filtered based on the source IP address to detect for invalid IPv4 addresses and invalid IPv6 address prefixes. The data packets may also be filtered based on other fields in other protocols. The malformed data packets are discarded, and the remaining data packets are sent to the wireless network.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 3 shows a call flow for packet data call origination by a wireless device.

FIG. 6 shows an exemplary set of packet filters.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for filtering malformed data packets may be used for various wireless communication networks such as a Code Division Multiple Access (CDMA) network, a Time Division Multiple Access (TDMA) network, a Frequency Division Multiple Access (FDMA) network, an Orthogonal Frequency Division Multiple Access (OFDMA) network, and so on. A CDMA network may utilize a CDMA radio access technology (RAT) such as cdma2000, Wideband-CDMA (W-CDMA), and so on. RAT refers to the technology used for radio communication. cdma2000 covers IS-95, IS-2000 and IS-856 standards. A TDMA network may utilize a TDMA RAT such as Global System for Mobile Communications (GSM), Digital Advanced Mobile Phone System (D-AMP), and so on. D-AMP covers IS-136 and IS-54. These various RATs and standards are known in the art. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. For clarity, the techniques are described below for a cdma2000 network.

Figure 1:
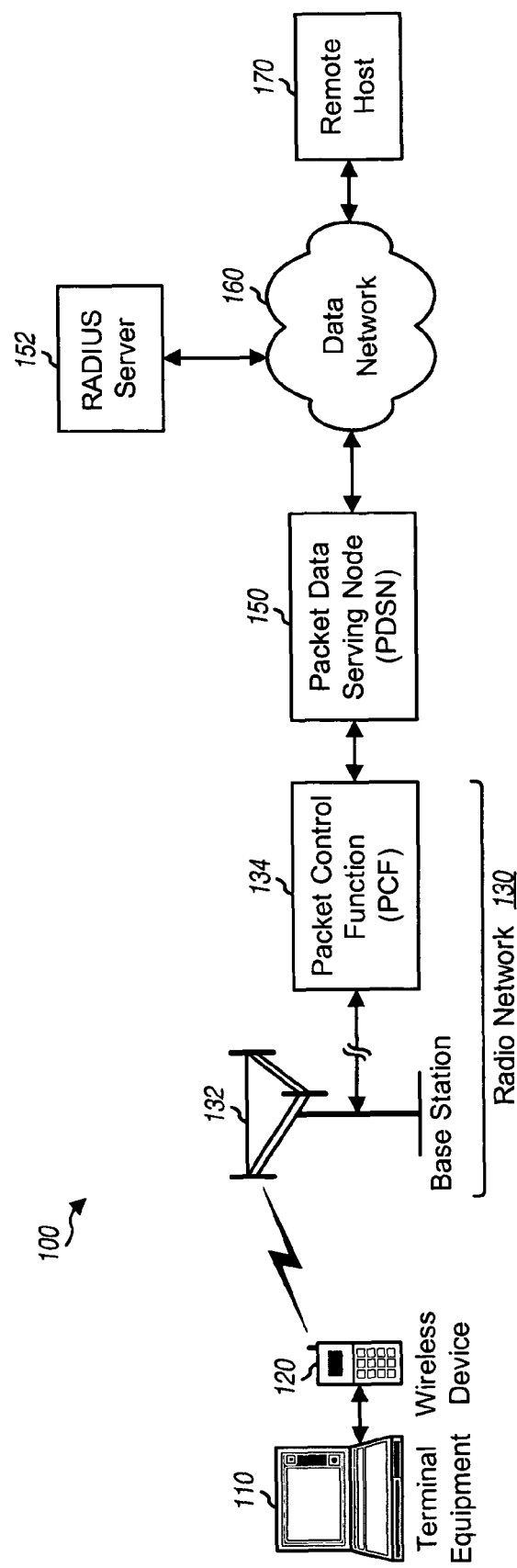
FIG. 1 shows a wireless network.

FIG. 1 shows a cdma2000 wireless network 100 that supports packet data and other services for wireless devices. For simplicity, FIG. 1 shows wireless network 100 including one base station 132, one packet control function (PCF) 134, and one packet data serving node (PDSN) 150. Base station 132 provides radio communication for wireless devices within its coverage. PCF 134 controls the transmission of data packets between base station 132 and PDSN 150. PDSN 150 supports data services for the wireless devices in network 100. For example, PDSN 150 may be responsible for establishment, maintenance, and termination of PPP sessions for the wireless devices and may further assign dynamic IP addresses to the wireless devices. PDSN 150 couples to a data network 160, which may be the Internet and/or some other data networks. PDSN 150 may communicate with various entities (e.g., a remote host 170) via data network 160. A RADIUS server 152 performs authentication and other functions for wireless network 100.

Wireless network 100 may be viewed as being composed of a radio network 130 and a packet data network. Radio network 130 includes base station 132 and PCF 134 and supports radio communication. The packet data network includes PDSN 150 and supports packet-switched communication between radio network 130 and external data networks.

A wireless network often includes many instances of each network entity, which may also be referred to by other names. For example, in a Universal Mobile Telecommunications System (UMTS) network that utilizes W-CDMA, base station 132 is referred to as a Node B, PCF 134 is referred to as a Serving GPRS Support Node (SGSN), and PDSN 150 is referred to as a Gateway GPRS Support Node (GGSN).

A wireless device 120 may communicate with zero, one, or multiple base stations at any given moment, depending on whether the wireless device is active and whether the wireless device is in handoff. Wireless device 120 may also be referred to as a mobile station (MS), a user equipment (UE), a user terminal, a subscriber unit, and so on. Wireless device 120 may be coupled to terminal equipment 110 via a wireline connection (as shown in FIG. 1) or a wireless connection. In the "attached" configuration, with terminal equipment 110 coupled to wireless device 120, a mobile user can obtain data services via terminal equipment 110. To obtain these data services, terminal equipment 110 communicates with wireless device 120, which further communicates with wireless network 100. Wireless device 120 provides radio communication to obtain the desired data services. Terminal equipment 110 supports end-to-end communication for the desired data services.

Figure 2:
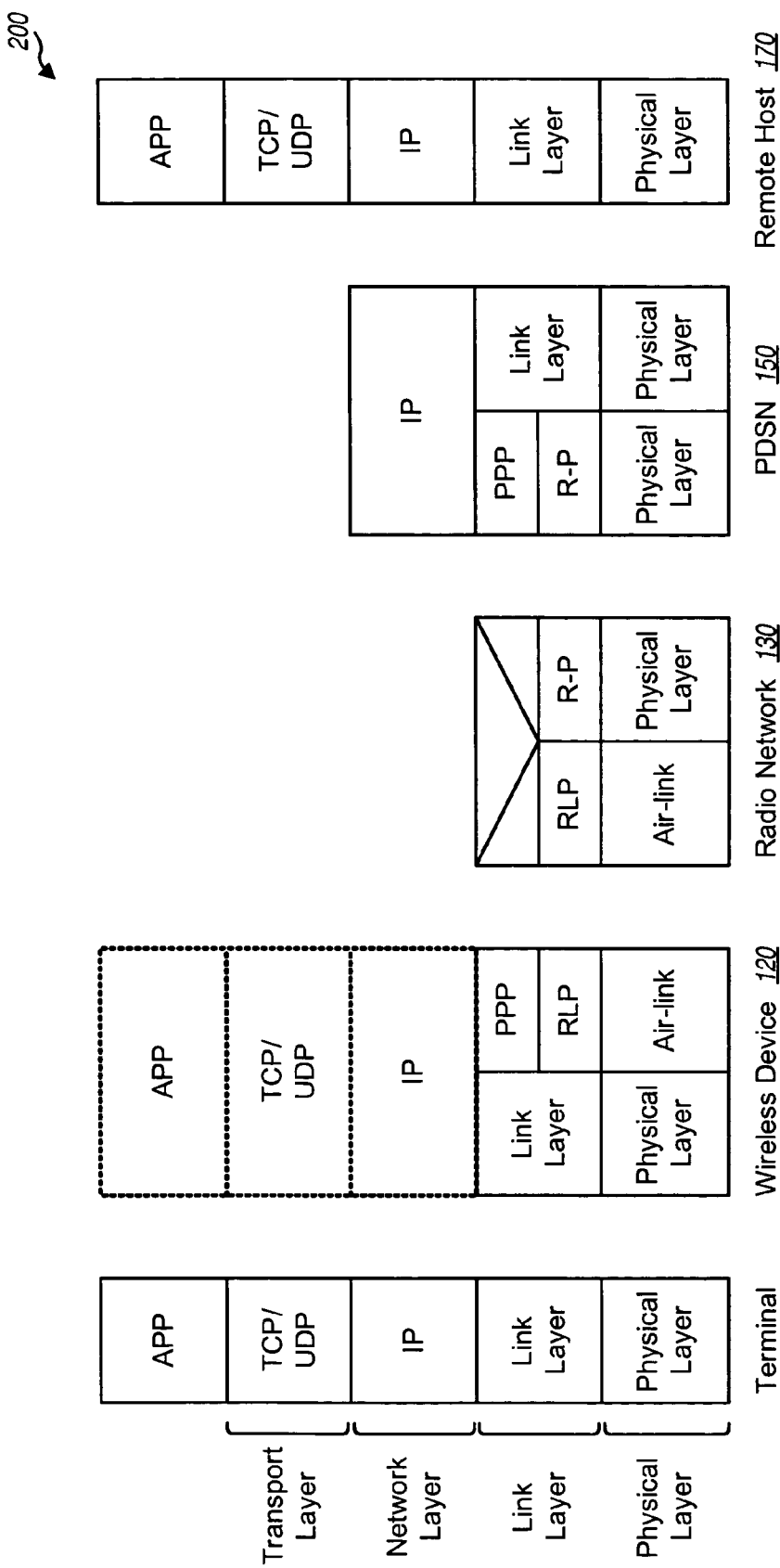
FIG. 2 shows an exemplary protocol stack.

FIG. 2 shows an exemplary protocol stack 200 for data communication between terminal equipment 110 and remote host 170, via wireless device 120 and wireless network 100. The protocol stack includes a transport layer, a network layer, a link layer, and a physical layer. Applications (APP) at terminal equipment 110, wireless device 120, and remote host 170 may exchange data using a data protocol stack composed of the transport and network layers.

Terminal equipment 110 and remote host 170 may communicate using Transmission Control Protocol (TCP), User Datagram Protocol (UDP), or some other protocol at the transport layer. TCP and UDP typically operate on top of IP at the network layer. Transport layer data (e.g., for TCP and/or UDP) is encapsulated in IP packets, which are exchanged between terminal equipment 110 and remote host 170 via wireless device 120, radio network 130, and PDSN 150. Wireless device 120 may also communicate with terminal equipment 110 and/or remote host 170 using TCP/UDP over IP, as shown by the dashed boxes.

The link layer between terminal equipment 110 and wireless device 120 may be Ethernet or some other protocol. The link layer between wireless device 120 and wireless network 100 is dependent on the wireless network technology and is implemented with PPP over Radio Link Protocol (RLP) for cdma2000. Wireless device 120 maintains a PPP session with PDSN 150 for a data session and communicates with radio network 130 via RLP for data exchanges. RLP operates on top of an air-link interface (e.g., IS-2000 or IS-856). Radio network 130 communicates with PDSN 150 via a technology-dependent interface (e.g., an "R-P" interface for cdma2000) that operates on top of a physical layer. PDSN 150 communicates with remote host 170 via IP over a link layer and a physical layer.

FIG. 3 shows a call flow 300 for packet data call origination by wireless device 120. The data call origination may be initiated by a user at wireless device 120, an application running on the wireless device, a request from terminal equipment 110, and so on. Wireless device 120 initially establishes radio connection with radio network 130 and brings up a traffic channel, which is used to send data to the radio network (step 210). Wireless device 120 then establishes a PPP session with PDSN 150 (step 220). To establish the PPP session, wireless device 120 and PDSN 150 exchange LCP (Link Control Protocol) packets to configure and test the data link. After the data link has been established, wireless device 120 may be authenticated via RADIUS server 152 to ensure that wireless device 120 can receive the requested data service. Wireless device 120 and PDSN 150 then exchange NCP (Network Control Protocol) packets or IPCP (Internet Protocol Control Protocol) packets to select and configure one or more network layer protocols, such as IP, which operate on top of PPP. The PPP establishment and authentication may also be performed in other manners. Wireless device 120 may then exchange packet data with remote host 170 via PDSN 150 (step 230).

Figures 4A, 4B:
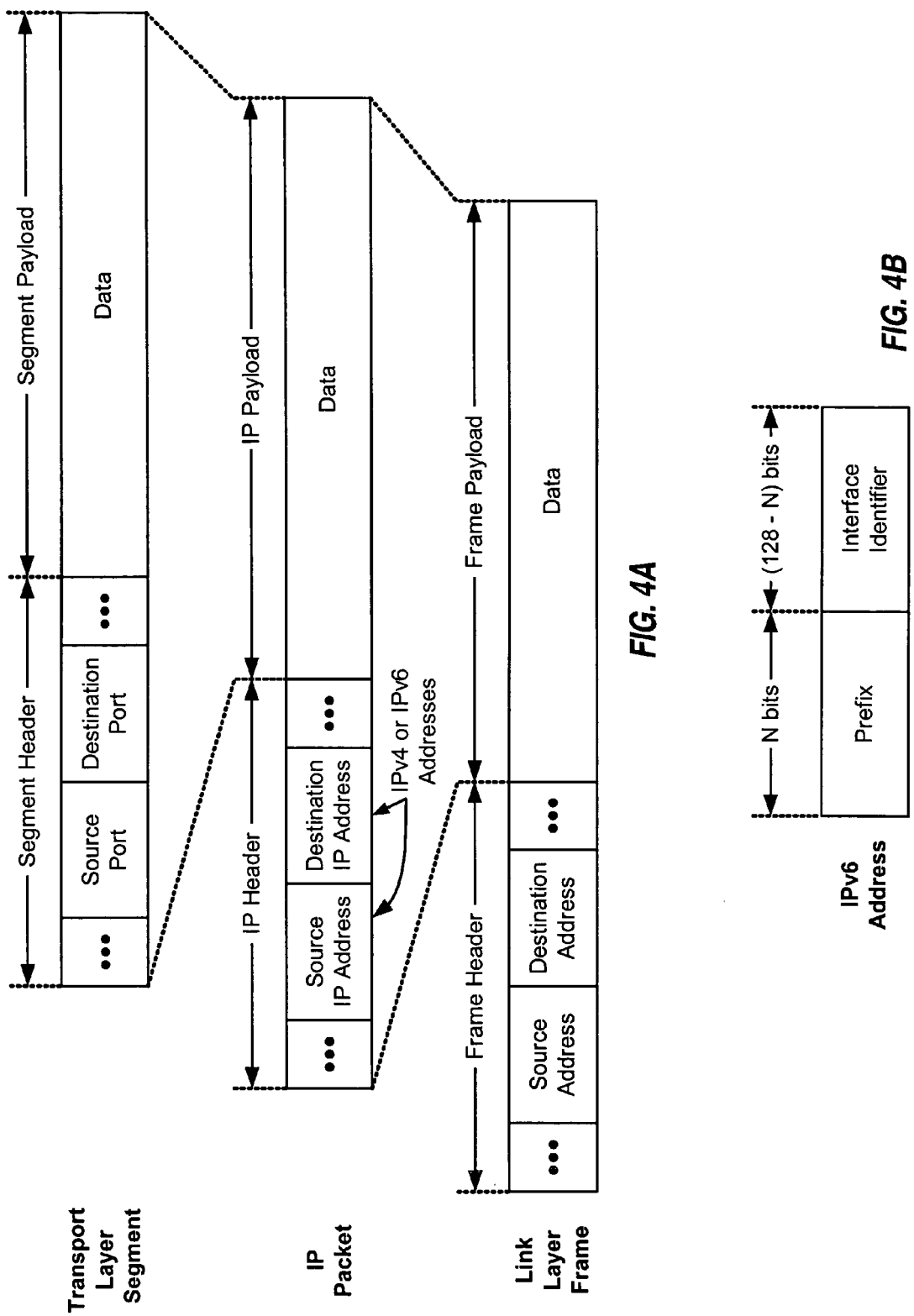
FIG. 4A shows data units at the transport, network, and link layers.
FIG. 4B shows the format of an IPv6 address.

FIG. 4A shows the formats and the encapsulation of data units for the transport, network, and link layers. At the transport layer, data is sent as transport layer segments (e.g., TCP segments), with each segment including a header and a payload. The segment header includes a source port and a destination port, where a port indicates a logical channel associated with the data in the payload. For IP at the network layer, data is sent as IP packets (or datagrams), with each IP packet including an IP header and an IP payload. The IP header includes a source IP address and a destination IP address for a source node and a destination node, respectively, for the IP packet. The source and destination IP addresses may be IPv4 addresses or IPv6 addresses. An IPv4 address is 32 bits whereas an IPv6 address is 128 bits. The IP payload may carry a transport layer segment or some other data. The IP packets are encapsulated in link layer frames. Each link layer frame typically includes a header (e.g., with the source and destination addresses) and a payload for the network layer data. For example, the header for an Ethernet frame includes a source Media Access Control (MAC) address and a destination MAC address for the sender and recipient of that Ethernet frame.

As used herein, a data packet is a unit of data at a layer. For example, a data packet may be a TCP segment, an IP packet, an Ethernet frame, and so on.

FIG. 4B shows the format of an IPv6 address, which is composed of a prefix and an interface identifier. The prefix may be a link-local prefix or a global prefix. A link-local prefix is a prefix that is known a priori and has a predefined value of FE80::0, where FE80 is the four most significant hexadecimal digits and all remaining hexadecimal digits are zero. A global prefix is a prefix that is assigned by a network.

There are no specific requirements for the widths of the prefix and the interface identifier. However, in a typical implementation, the interface identifier is 64 bits long and the prefix is also 64 bits long.

Figure 5:
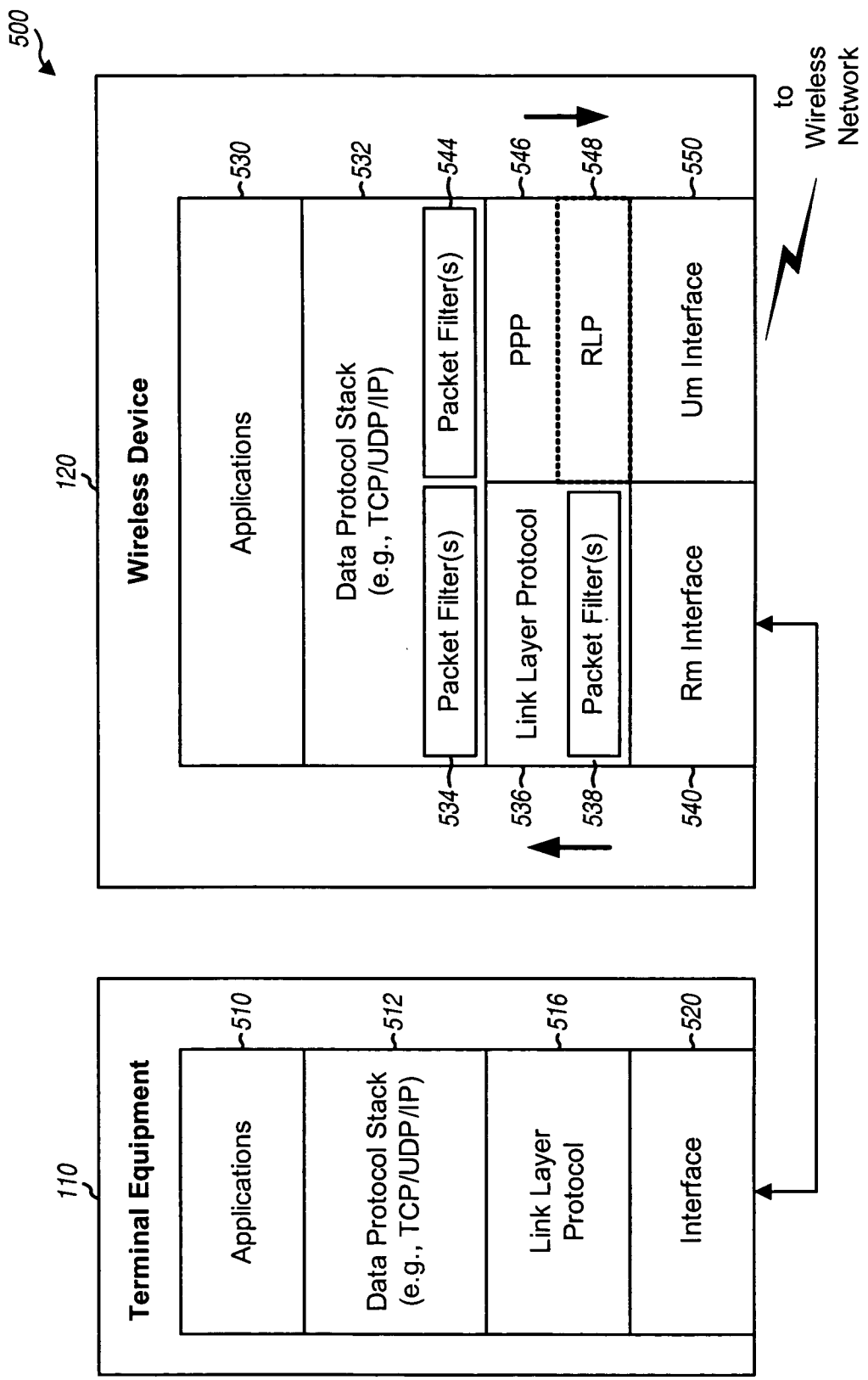
FIG. 5 shows a terminal equipment and a wireless device.

FIG. 5 shows an embodiment of terminal equipment 110 and wireless device 120. At terminal equipment 110, applications 510 execute over a data protocol stack 512, which may utilize TCP and/or UDP over IP. In general, a data protocol stack may implement any combination of protocols for any number of layers. Data protocol stack 512 operates over a link layer protocol 516, which may be Ethernet, IEEE 802.11, Bluetooth, and so on. Terminal equipment 110 communicates with wireless device 120 via an interface 520. At wireless device 120, applications 530 execute over a data protocol stack 532, which may utilize TCP and/or UDP over IP. Wireless device 120 communicates with terminal equipment 110 via link layer protocol 536 and an Rm interface 540. Wireless device 120 communicates with wireless network 100 using PPP 546 and RLP 548 at the link layer and via a Um interface 550.

Wireless network 100 may assign a single IPv4 or IPv6 address to wireless device 120. This IP address is denoted as x in the following description. Wireless device 120 may in turn assign IP address x over to terminal equipment 110, which is then able to obtain data connectivity using this IP address. All wireless specific protocols still run in wireless device 120. Inbound IP packets with destination IP address x are sent from wireless network 100 to wireless device 120 and are received via Um interface 550. Wireless device 120 forwards these IP packets to terminal equipment 110 via Rm interface 540. Outbound IP packets generated by terminal equipment 110 are sent from interface 520 to Rm interface 540. Wireless device 120 then forwards these IP packets to Um interface 550, which then sends these IP packets to wireless network 100. The IP address x assigned to wireless device 120 may thus be reused to allow terminal equipment 110 to connect to wireless network 100 and obtain data services. Wireless device 120 may act as a transparent conduit via which IP packets may be exchanged between terminal equipment 110 and wireless network 100.

Terminal equipment 110 may generate malformed data packets and may send these packets to wireless device 120 for transmission to wireless network 100. A malformed data packet is a data packet that is unacceptable to a wireless network (e.g., PDSN 150) and is discarded by the wireless network.

PDSN 150 may also take corrective actions in response to receiving malformed data packets, e.g., as specified by TIA/EIA/IS-835-A entitled "CDMA2000 Wireless IP Network Standard," which is publicly available. TIA/EIA/IS-835-A requires PDSN 150 to perform ingress address filtering and check the source IP address of each IPv4 packet received on the PPP link from wireless device 120. If the source IP address is invalid, then PDSN 150 discards the IP packet and may send an LCP Configure-Request message to restart the PPP session. A source IP address is invalid if it does not match one of the IP addresses that have been assigned to wireless device 120. PDSN 150 is required to send the message to restart the PPP session if PDSN 150 continues to receive IP packets with invalid source IP addresses from wireless device 120. TIA/EIA/IS-835-A also requires PDSN 150 to check the prefix of the source IP address for each IPv6 packet received on the PPP link from wireless device 120. If the prefix is not associated with the PPP session for wireless device 120, then PDSN 150 discards the IP packet and sends an LCP Configure-Request message to restart the PPP session. PDSN 150 also silently discards certain types of IPv6 packets, such as packets with unspecified IPv6 source addresses and for neighbor solicitation for duplicate address detection (DAD). An unspecified address is an address that is never assigned to any node and may be used to indicate the absence of an address.

Malformed data packets are undesirable for several reasons. First, radio resources are consumed to transmit malformed data packets that are discarded by the wireless network. Second, malformed data packets may trigger restart of the PPP session, which interrupts the transmission of packet data until the PPP renegotiation is completed, wastes radio resources, and loads PDSN 150 and other network entities.

In an aspect, one or more packet filters are installed on wireless device 120 and used to extract and discard malformed data packets received from terminal equipment 110 and/or applications running at wireless device 120. In general, a packet filter may operate on one or more fields of one or more protocols for one or more layers. A packet filter is associated with (1) a value or a set of values for each field on which the filter operates and (2) an action to be performed on a data packet based on a filter result. A packet filter may be applied to a data packet by comparing the value received in the data packet for each field in which the filter operates against the value(s) stored for that field by the filter. An action is performed on the data packet depending on whether the received value matches the stored value(s). For simplicity, the following description assumes that each packet filter operates on one field of one protocol in one layer.

FIG. 6 shows an exemplary set of packet filters 600 that may be used to filter out malformed data packets. To avoid restarting the PPP session as specified in TIA/EIA/IS-835-A, a packet filter 612 is defined for the source IP address for IPv4 packets, and a packet filter 614 is defined for the prefix of the source IP address for IPv6 packets. Packet filter 612 filters IPv4 packets for IP addresses (if any) that have been assigned to wireless device 120 and are considered as valid by PDSN 150. For the example shown in FIG. 6, packet filter 612 is associated with a single IPv4 address of y and passes IPv4 packets with source IP address of y. Packet filter 614 filters IPv6 packets for prefixes (if any) that are associated with the PPP session for wireless device 120. For the example shown in FIG. 6, packet filter 614 is associated with a single prefix value of z and passes IPv6 packets with a source IP address prefix of z. Prefix z may be any number of hexadecimal digits long.

Packet filters 612 and 614 may be used to filter out malformed data packets having invalid source IPv4 addresses and invalid source IPv6 address prefixes, respectively. These malformed data packets would be discarded by PDSN 150 and may trigger restart of the PPP session, as specified by TIA/EIA/IS-835-A.

Additionally or alternatively, packet filters may be defined to filter out malformed data packets based on other fields and/or other protocols. For the example shown in FIG. 6, a packet filter 616 is defined for the source address for Internetwork Packet Exchange (IPX), which is a networking protocol used on some computers. Packet filter 616 is associated with a single address of u (which is 6 bytes long) and passes IPX packets with a source address of u. A packet filter 618 is defined for the source port for TCP at the transport layer. Packet filter 618 is associated with a single source port of v (which is 2 bytes long) and passes TCP segments with a source port of v. A packet filter 620 is defined for the source address for Ethernet at the link layer. Packet filter 620 is associated with a single MAC address of w (which is 6 bytes long) and passes Ethernet frames with a source MAC address of w. A default packet filter 622 may be defined with wildcard values and may discard all data packets that do not pass any of the packet filters (as shown in FIG. 6).

In general, any number of packet filters may be defined, and each packet filter may operate on any field of any protocol in any layer. Table 1 lists some common protocols, the layers for these protocols, and the fields that may be used for packet filtering. A packet filter may operate on any one or any combination of the fields given in Table 1.

TABLE 1

| Layer | Protocol | Fields |
|---|---|---|
| Transport | UDP | source port, destination port, port ranges |
|  | TCP | source port, destination port, port ranges |
|  | ICMP | message type, code |
| Network | IPv4 | source IP address, destination IP address, time to live |
|  | IPv6 | source IP address, destination IP address, source IP address prefix, destination IP address prefix |
|  | IPX | source address, destination address |
| Link | Ethernet | source MAC address, destination MAC address |
|  | PPP | protocol |

Internet Control Message Protocol (ICMP) is used to report problems with delivery of IP packets. Table 1 is not exhaustive. A packet filter may operate on fields and/or protocols that are not listed in Table 1.

For example, with IPv4, the time to live field indicates the maximum number of routers that an IP packet can pass through before the IP packet is discarded. If an inbound IP packet received from terminal equipment 110 has a value of 1 for the time to live field and this IP packet is not destined for PDSN 150, then wireless device 120 may discard this IP packet since PDSN 150 would discard the IP packet if sent.

Referring back to FIG. 2, wireless device 120 may communicate with terminal equipment 110 via the link layer and may not terminate IP packets or TCP/UDP segments sent by terminal equipment 110. Wireless device 120 may nevertheless perform filtering at the network and transport layers. This may be achieved, for example, by making a copy of the data packets received from terminal equipment 110, unframing the copied packets to the extent necessary to determine the pertinent fields, filtering these fields, and passing or discarding the data packets based on the filter results. The packet filtering may also be performed on some number of bits starting at a particular offset from a protocol header in a given layer. Since most protocol headers have a fixed portion, packet filtering may be performed on fields in the fixed portion of a protocol header by specifying the number of bits and the offset.

A packet filter may be programmable with different values. For example, the source address for a packet filter may be programmed at the start of a data call based on the address assigned by the wireless network. The filter logic and operation may also be programmable. A packet filter may also be selectively enabled and disabled depending on, e.g., the specific network via which packet data is exchanged, the data services being received, the applications that are active, and so on. For example, packet filters may be enabled if wireless device 120 communicates with a cdma2000 network in order to avoid triggering restart of PPP by PDSN 150. Packet filters may be disabled if wireless device 120 communicates with another wireless network (e.g., an IEEE 802.11 network) that does not perform ingress address filtering.

The packet filters may used to trigger a variety of actions. In an embodiment, a data packet that passes a packet filter is sent to wireless network 100, and a data packet that does not pass a packet filter is provided to the next packet filter. A data packet that does not pass any packet filter is discarded and not sent to wireless network 100. For the example shown in FIG. 6, IP packets with source IP address of y would pass packet filter 612 and would be sent to wireless network 100. IP packets with source IP addresses other than y may be provided to packet filter 614. These IP packets would pass packet filter 614 if they have source IP address prefix of z and may be provided to packet filter 616 otherwise. The subsequent packet filtering may be performed in similar manner. Default packet filter 622 determines the action to be performed for data packets that do not pass any of packet filters 612 through 620. In another embodiment, a data packet that does not pass a packet filter is discarded, and a data packet that passes a packet filter is provided to the next packet filter or is sent to wireless network 100. The logical rules and the actions for the packet filtering may be determined by various factors such as, e.g., the number of packet filters that are enabled, the desired results, and so on.

Referring back to FIG. 5, packet filters 534 and 538 may filter incoming data packets received from terminal equipment 110 via Rm interface 540. Packet filters 534 and 538 may operate on fields of one or more protocols at the link, network and/or transport layers. For example, packet filter(s) 538 may operate on fields of link layer protocols, and packet filter(s) 534 may operate on fields of network and/or transport protocols. Packet filter(s) 544 may filter outbound data packets received from applications 530 and may operate on fields of one or more protocols at the network and/or transport layer.

Figure 7:
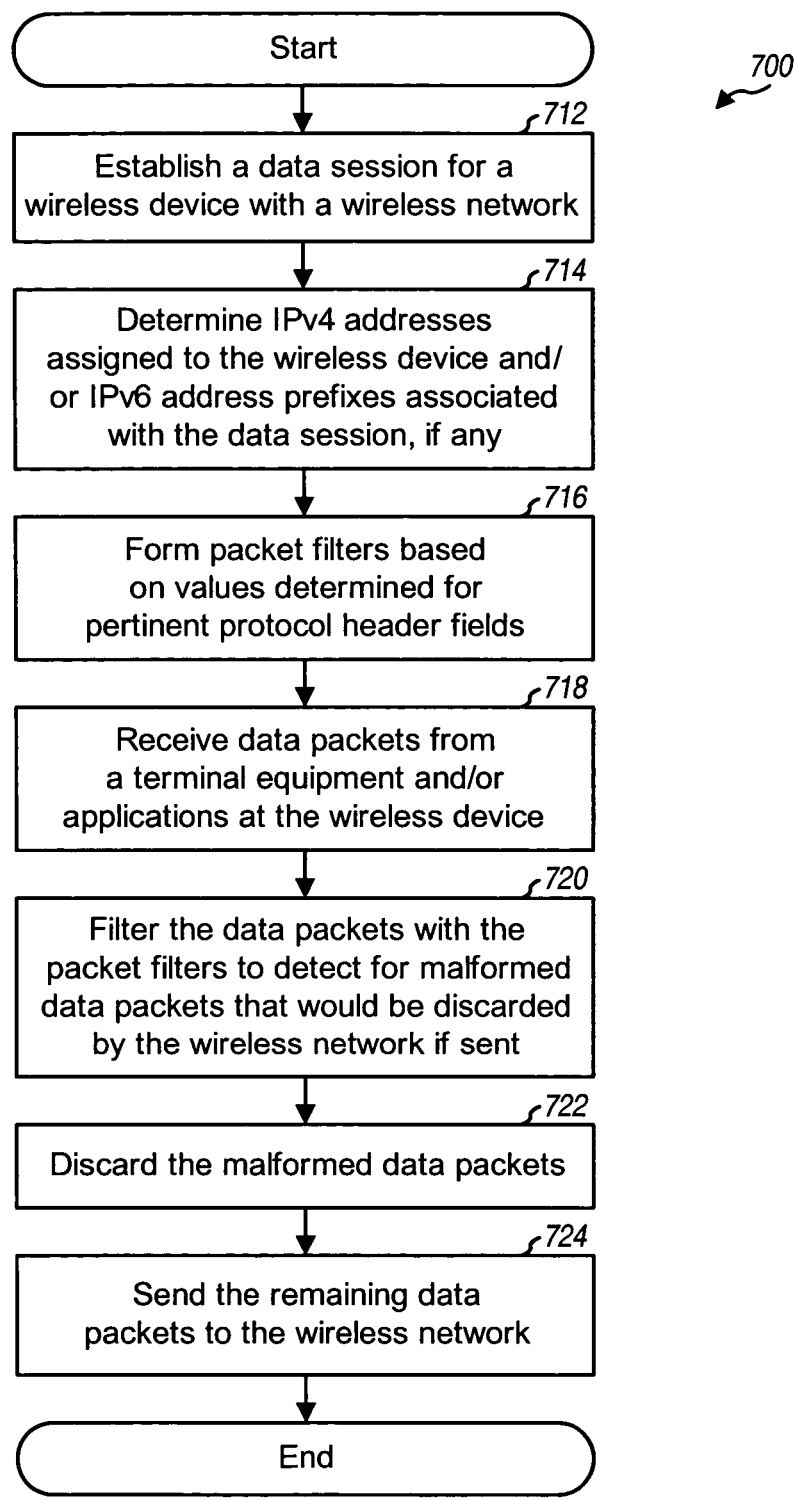
FIG. 7 shows a process performed by the wireless device for packet filtering.

FIG. 7 shows a process 700 performed by wireless device 120 for packet filtering. Initially, a data session is established for wireless device 120 with wireless network 100, e.g., as shown in FIG. 3 (block 712). For cdma2000, a PPP session is established for wireless device 120 for the data session. IPv4 addresses that have been assigned to wireless device 120 and/or IPv6 address prefixes that are associated with the data session, if any, are determined (block 714). Values for other protocol header fields used for packet filtering are also determined. Packet filters used to filter out malformed data packets are formed based on the values determined for the pertinent protocol header fields (block 716).

Thereafter, data packets are received from terminal equipment 110 and/or applications running at wireless device 120 (block 718). The data packets are filtered with the packet filters to detect for malformed data packets that would be discarded by wireless network 100 if sent (block 720). To avoid restart of the PPP session, the data packets may be filtered to detect for (1) malformed data packets with source IPv4 addresses that are different from the IPv4 addresses (if any) assigned to wireless device 120 and (2) malformed data packets with source IPv6 addresses having prefixes that are different from the prefixes (if any) associated with the PPP or data session. The data packets may also be filtered based on other fields in other protocols, as described above. The malformed data packets are discarded (block 722), and the remaining data packets are sent to wireless network 100 (block 724).

The techniques described herein may be used for various types of data calls such as, e.g., sockets and tethered data calls, Simple IP and Mobile IP data calls, and so on. A tethered data call is a data call made by a terminal equipment (e.g., a laptop computer) that is coupled to the wireless device and is using the wireless device to obtain data services.

Figure 8:
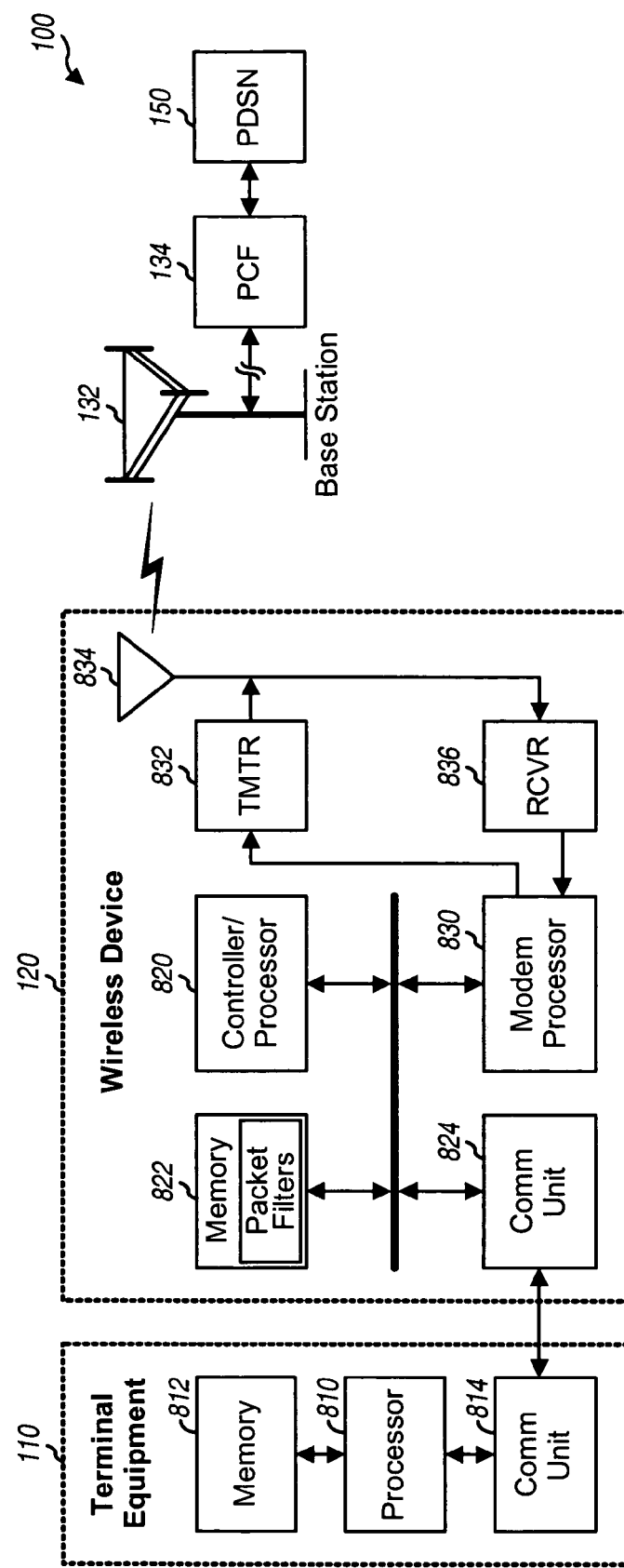
FIG. 8 shows a block diagram of the wireless device and terminal equipment.

FIG. 8 shows a block diagram of an embodiment of wireless device 120 and terminal equipment 110. Wireless device 120 is capable of providing bidirectional communication with wireless network 100. On the transmit path, a modem processor 830 processes (e.g., encodes and modulates) data to be transmitted by wireless device 120 and provides data chips to a transmitter unit (TMTR) 832. Transmitter unit 832 conditions (e.g., converts to analog, filters, amplifies, and frequency upconverts) the data chips and generates a modulated signal, which is transmitted via an antenna 834. On the receive path, signals transmitted by base stations in wireless network 100 are received by antenna 834 and provided to a receiver unit (RCVR) 836. Receiver unit 836 conditions (e.g., filters, amplifies, and frequency downconverts) the received signal, digitizes the conditioned signal, and provides data samples to modem processor 830 for demodulation and decoding.

A controller/processor 820 performs various functions and controls the operation of the processing units within wireless device 120. A memory 822 stores data and program codes used by controller/processor 820. A communication unit 824 interfaces with external entities such as terminal equipment 110.

Wireless device 120 may perform packet filtering as described above to discard malformed data packets. Memory 822 may store packet filters to be applied to inbound data packets from terminal equipment 110 as well as outbound data packets from applications running at wireless device 120. Controller/processor 820 may implement the data protocol stack and the link layer protocols, as shown in FIG. 5. Controller/processor 820 may also apply the packet filters on inbound data packets and/or outbound data packets.

Terminal equipment 110 includes a processor 810 that performs processing for the terminal equipment, a memory 812 that stores data and program codes used by processor 810, and a communication unit 814 that supports communication with other entities such as wireless device 120.

The packet filtering techniques described herein may be implemented by various means. For example, these techniques may be implemented in hardware, software, or a combination thereof. For a hardware implementation, the processing units used to perform packet filtering may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the packet filtering techniques may be implemented with modules (e.g., procedures, functions, and so on) that perform the functions described herein. The software codes may be stored in a memory unit (e.g., memory 822 in FIG. 8) and executed by a processor (e.g., controller/processor 820). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of sending data, comprising:
   receiving data packets at a mobile station;
   filtering the data packets by the mobile station at multiple layers of a protocol stack to detect for malformed data packets that would be discarded by a wireless network if received from the mobile station;
   discarding the malformed data packets; and
   sending remaining data packets to the wireless network.

2. The method of claim 1, wherein the receiving the data packets comprises
   receiving the data packets from a terminal equipment coupled to the mobile station.

3. The method of claim 1, further comprising:
   establishing a Point-to-Point Protocol (PPP) session with the wireless network for the mobile station.

4. The method of claim 3, wherein the filtering the data packets comprises
   filtering the data packets to detect for malformed data packets that would trigger restart of the PPP session if sent.

5. The method of claim 1, wherein the filtering the data packets comprises
   filtering the data packets to detect for malformed data packets with source Internet Protocol Version 4 (IPv4) addresses different from at least one IP address assigned to the mobile station.

6. The method of claim 1, wherein the filtering the data packets comprises
   filtering the data packets to detect for malformed data packets with source Internet Protocol Version 6 (IPv6) addresses having prefixes different from at least one prefix associated with the mobile station.

7. The method of claim 6, further comprising:
   establishing a Point-to-Point Protocol (PPP) session for the mobile station; and
   determining the at least one prefix for the PPP session.

8. The method of claim 1, wherein the filtering the data packets comprises
   filtering the data packets based on a source Media Access Control (MAC) address, a destination MAC address, a source port, a destination port, a time to live field in Internet Protocol Version 4 (IPv4), or a combination thereof.

9. The method of claim 1, wherein the filtering the data packets comprises
   forming at least one packet filter, each packet filter operating on at least one field of at least one protocol in at least one layer of the protocol stack, and
   filtering the data packets with the at least one packet filter.

10. The method of claim 9, further comprising:
    selectively enabling or disabling the at least one packet filter based on wireless network type, data service being received, applications generating the data packets, or a combination thereof.

11. The method of claim 9, further comprising:
    programming the at least one packet filter with values applicable for a data session.

12. A mobile station comprising:
    a communication unit operative to receive data packets at the mobile station; and
    a processor operative to filter the data packets at multiple layers of a protocol stack to detect for malformed data packets that would be discarded by a wireless network if received from the mobile station, to discard the malformed data packets, and to send remaining data packets to the wireless network.

13. The apparatus of claim 12, wherein the processor is operative to establish a Point-to-Point Protocol (PPP) session with the wireless network for the mobile station and to filter the data packets to detect for malformed data packets that would trigger restart of the PPP session if sent.

14. The apparatus of claim 12, wherein the processor is operative to filter the data packets to detect for malformed data packets with source Internet Protocol Version 4 (IPv4) addresses different from at least one IPv4 address assigned to the mobile station.

15. The apparatus of claim 12, wherein the processor is operative to filter the data packets to detect for malformed data packets with source Internet Protocol Version 6 (IPv6) addresses having prefixes different from at least one prefix associated with the mobile station.

16. The apparatus of claim 12, further comprising:
a memory operative to store at least one packet filter, each packet filter operating on at least one field of at least one protocol in at least one layer of the protocol stack, and wherein the processor is operative to filter the data packets with the at least one packet filter.

17. A mobile station comprising:
means for receiving data packets at the mobile station;
means for filtering the data packets at multiple layers of a protocol stack to detect for malformed data packets that would be discarded by a wireless network if received from the mobile station;
means for discarding the malformed data packets; and
means for sending remaining data packets to the wireless network.

18. The apparatus of claim 17, further comprising:
means for establishing a Point-to-Point Protocol (PPP) session with the wireless network for the mobile station, and
wherein the means for filtering the data packets comprises means for filtering the data packets to detect for malformed data packets that would trigger restart of the PPP session if sent.

19. The apparatus of claim 17, wherein the means for filtering the data packets comprises
means for filtering the data packets to detect for malformed data packets with source Internet Protocol Version 4 (IPv4) addresses different from at least one IPv4 address assigned to the mobile station.

20. The apparatus of claim 17, wherein the means for filtering the data packets comprises
means for filtering the data packets to detect for malformed data packets with source Internet Protocol Version 6 (IPv6) addresses having prefixes different from at least one prefix associated with the mobile station.

21. A non-transitory processor readable media for storing instructions operable in mobile station to:
receive data packets;
filter the data packets by the mobile station at multiple layers of a protocol stack to detect for malformed data packets that would be discarded by a wireless network if received from the mobile station;
discard the malformed data packets; and
forward remaining data packets to the wireless network.

22. The processor readable media of claim 21, and further for storing instructions operable to:
establish a Point-to-Point Protocol (PPP) session with the wireless network for the mobile station; and
filter the data packets to detect for malformed data packets that would trigger restart of the PPP session if sent.

23. The processor readable media of claim 21, and further for storing instructions operable to:
filter the data packets to detect for malformed data packets with source Internet Protocol Version 4 (IPv4) addresses different from at least one IPv4 address assigned to the mobile station.

24. The processor readable media of claim 21, and further for storing instructions operable to:
filter the data packets to detect for malformed data packets with source Internet Protocol Version 6 (IPv6) addresses having prefixes different from at least one prefix associated with the mobile station.

* * * * *